O. O. McKINNEY.
AGRICULTURAL MACHINE.
APPLICATION FILED SEPT. 30, 1914.
1,141,195.
Patented June 1, 1915.
5 SHEETS—SHEET 1.
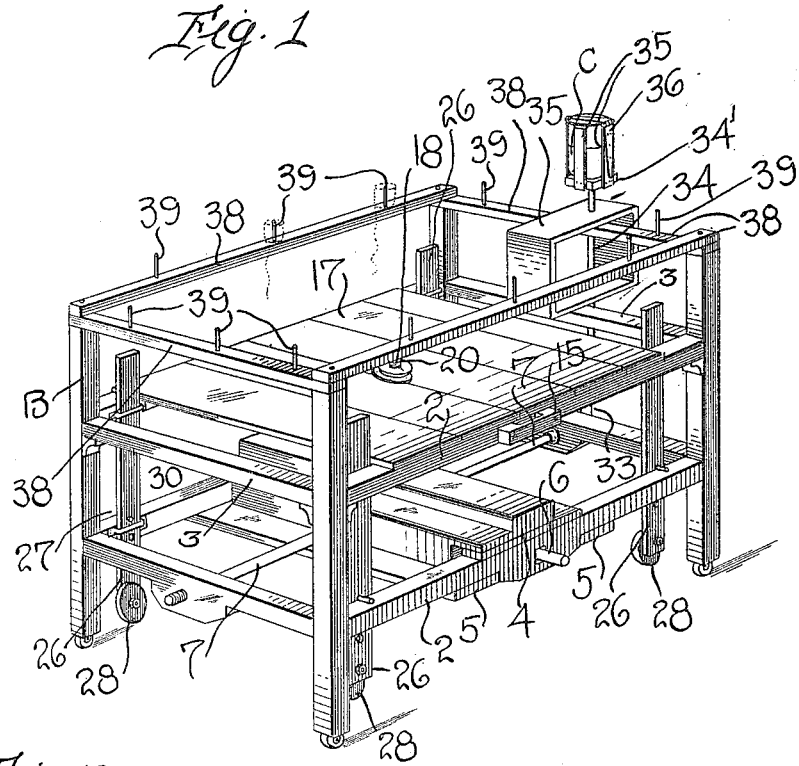
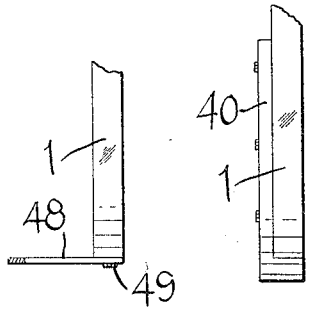
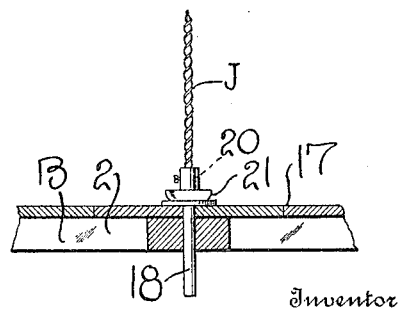
Witnesses
Robert M. Sutphen
A. I. Hind
Inventor
ORA O. MCKINNEY
By Watson E. Coleman
Attorney

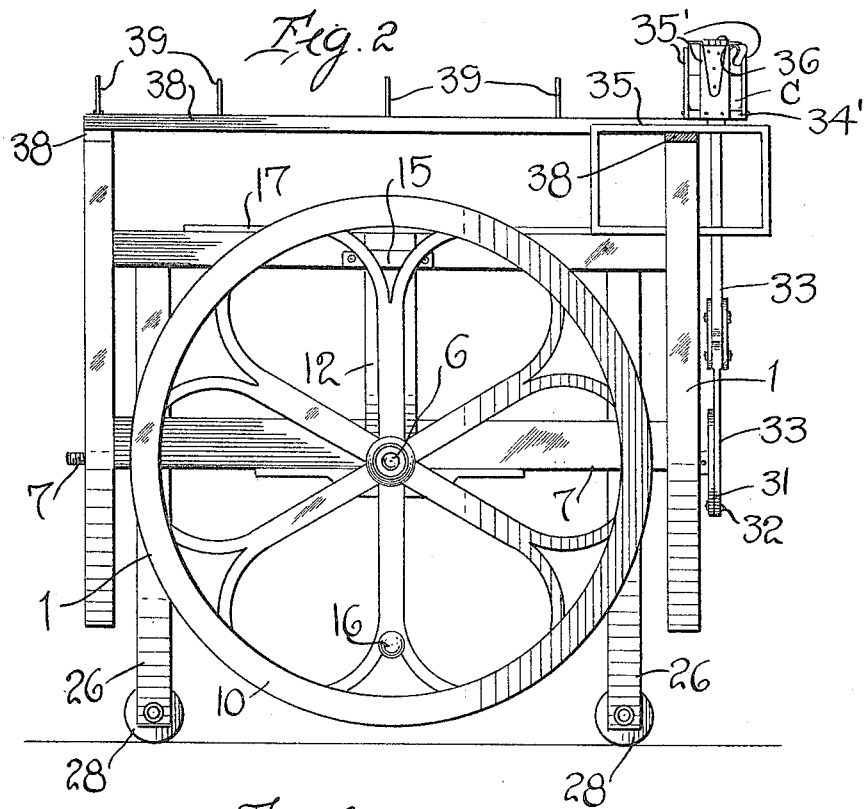
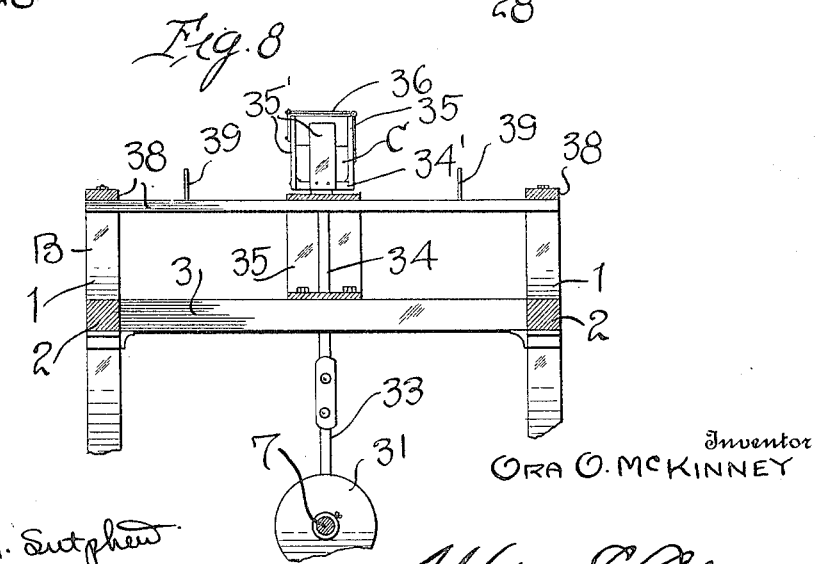

O. O. McKINNEY.
AGRICULTURAL MACHINE.
APPLICATION FILED SEPT. 30, 1914.
1,141,195.
Patented June 1, 1915.
5 SHEETS—SHEET 3.
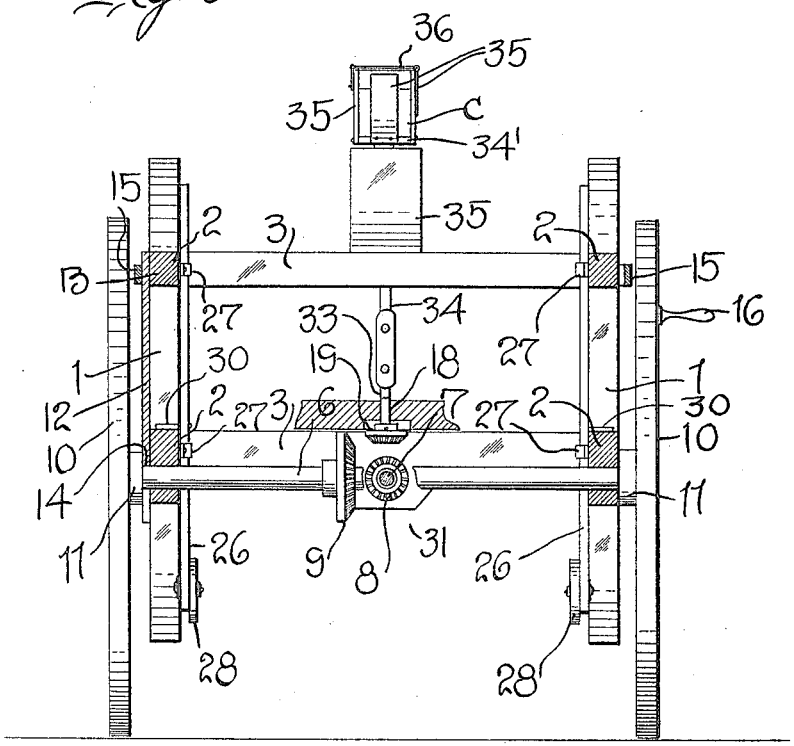
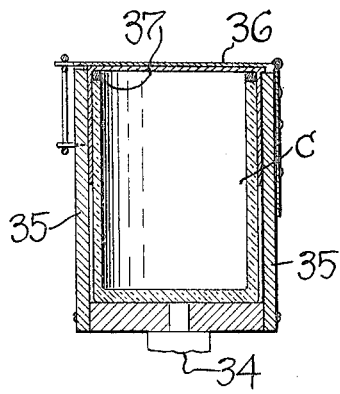
Inventor
ORA O. McKINNEY
Witnesses
Robert M. Lutphen
A. J. Hird
By Watson E. Coleman
Attorney O. O. McKINNEY.
AGRICULTURAL MACHINE.
APPLICATION FILED SEPT. 30, 1914.
1,141,195.
Patented June 1, 1915.
5 SHEETS—SHEET 4.
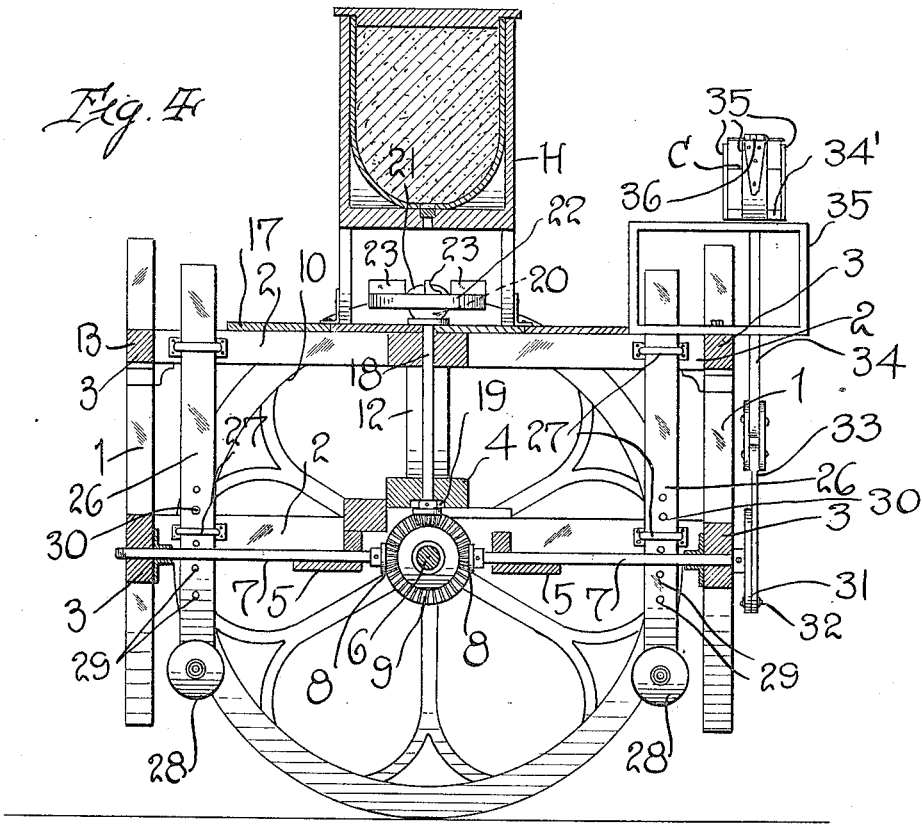
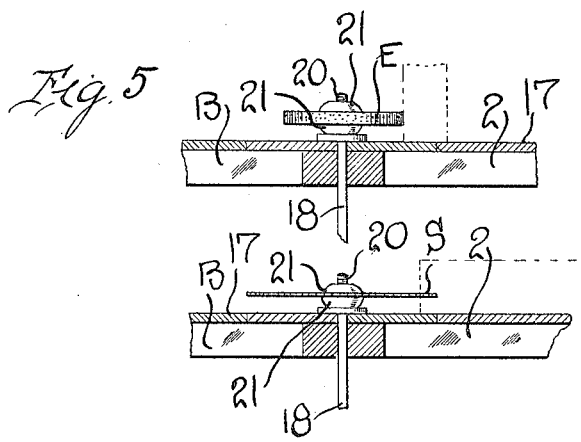
Witnesses
Robert M. Sutphen
A. I. Hind.
Inventor
ORA O. McKINNEY
By Watson E. Coleman
Attorney

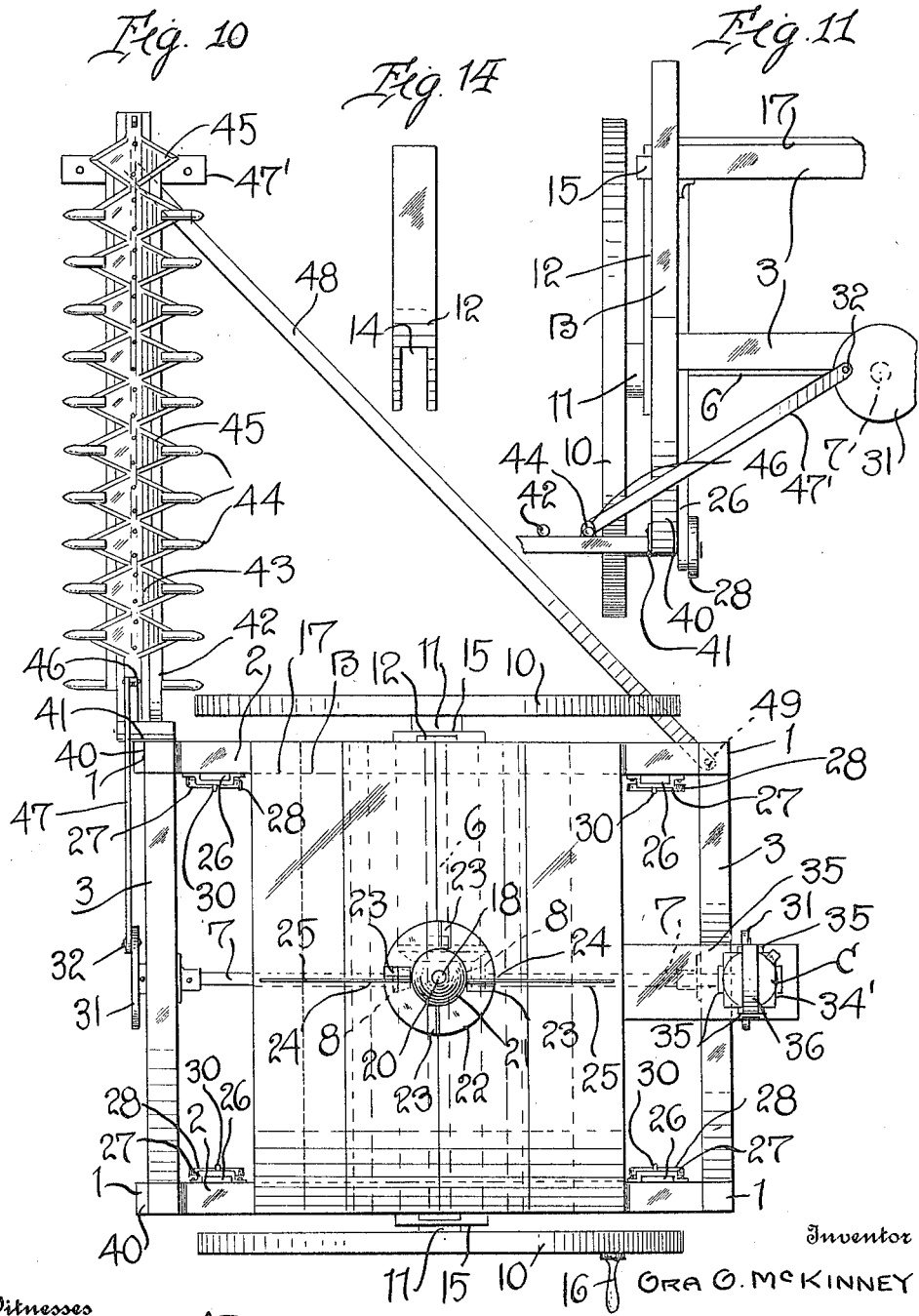

UNITED STATES PATENT OFFICE.

ORA O. McKINNEY, OF FRANKFORT, INDIANA.

AGRICULTURAL MACHINE.

1,141,195. Specification of Letters Patent. Patented June 1, 1915.

Application filed September 30, 1914. Serial No. 864,316.

*To all whom it may concern:*

Be it known that I, ORA O. MCKINNEY, a citizen of the United States, residing at Frankfort, in the county of Clinton and State of Indiana, have invented certain new and useful Improvements in Agricultural Machines, of which the following is a specification, reference being had to the accompanying drawings.

This invention relates to certain improvements in agricultural machines, and an object of my invention is to provide a novel and improved machine of this general character capable of a multiplicity of differing usages.

It is also an object of my invention to provide a novel and improved device of this general character including a body member capable of adjustment relatively to a supporting surface, and wherein the operating means for the machine may be employed as supporting wheels when the body is adjusted into a position above the supporting surface.

Furthermore, it is an object of my invention to provide a device of this general character having novel and improved means whereby the same, when not in use, may be used as an article of furniture and wherein the various parts thereof are operated from a common driving element.

It is also an object of my invention to provide a novel and improved device of this general character wherein are employed supplemental supporting members capable of adjustment independently of the body and adapted to serve as a medium whereby said body may be maintained in an adjusted position above its supporting surface and whereby said body may be transported from one locality to another with convenience and facility.

The invention consists in the details of construction and in the combination and arrangement of the several parts of my improved agricultural machine whereby certain important advantages are attained and the device is rendered simpler, less expensive and otherwise more convenient and advantageous for use, all as will be hereinafter more fully set forth.

The novel features of construction will be carefully defined in the appended claims.

In order that my invention may be the better understood, I will now proceed to describe the same with reference to the accompanying drawings, wherein—

Figure 1 is a view in perspective of a machine constructed in accordance with an embodiment of my invention, with the agricultural implements removed and as adapted to be employed in the household; Fig. 2 is a view in side elevation of the device as disclosed in Fig. 1, but with the body portion adjusted out of contact with the supporting surface; Fig. 3 is a transverse vertical section taken through the device, illustrating the device in a position whereby the movable parts thereof are caused to operate during the travel of the body; Fig. 4 is a longitudinal vertical sectional view illustrating the device assembled to serve as a seeder; Fig. 5 is a fragmentary sectional view showing the mounting of an emery wheel; Fig. 6 is a fragmentary sectional view showing the mounting of a saw; Fig. 7 is a fragmentary sectional view showing the mounting of a boring tool; Fig. 8 is a fragmentary sectional view illustrating an agitating mechanism adapted to be employed in connection with my machine; Fig. 9 is an enlarged fragmentary sectional view taken through the agitating mechanism and illustrating certain details of construction; Fig. 10 is a view in top plan of my improved machine showing a mower attachment connected thereto and also illustrating a fan attachment; Fig. 11 is a fragmentary view in elevation illustrating the drive connection for the mower attachment; Fig. 12 is a fragmentary elevational view, illustrating the mounting of the supplemental member adapted to be employed in connection with the mower attachment; Fig. 13 is a fragmentary view illustrating a connection for the bracing rod for the mower attachment; and Fig. 14 is an elevational view, detached, of the member for controlling the endwise adjustable movement of the drive shaft.

As disclosed in the accompanying drawings, B denotes the body of my improved device comprising the corner vertical posts 1 tied or connected one with the other by the side beams 2 and the end beams 3, and the side beams 2 are further united at substantially their longitudinal center by the cross beam 4 resting upon the upper edges thereof and by the supplemental cross beams 5 suitably secured to the under edges of the side beams 2 and in vertical planes a predetermined distance beyond the opposite sides of the beam 4.

Operatively supported by the side beams 2 between the supplemental cross beams 5 is a drive shaft 6 projecting beyond opposite sides of the body B and capable of longitudinal movement, for purposes to be hereinafter more particularly referred to. Operatively supported by each of the supplemental cross beams 5 and the adjacent end beam 3 is the horizontal shaft 7 disposed longitudinally of the body B and terminating beyond the end thereof, and the inner extremity of such shaft is provided with a beveled gear 8 adapted to mesh with the beveled gear 9 fixed to the drive shaft 6, and in practice I find it of advantage to have the gear 9 of materially greater diameter than the coacting gear 8, for reasons which are believed to be clearly apparent to those skilled in the art to which my present invention appertains.

To the projected extremities of the shaft 6 are affixed the wheels 10, one of which being provided with a driving means while the second serves as a balance or fly wheel, and it will be readily perceived that upon requisite endwise movement being imparted to the shaft 6, the gear 9 thereon may be brought into or out of engagement with the gears 8 in accordance with the requirements of practice. The limit of movement of the shaft 6 is under control of the hubs 11 of the wheels 10 and in order to maintain the shaft in either of its adjustments so that the gears may be maintained in or out of mesh, I provide an elongated member 12 preferably of metal having one extremity bifurcated, as at 14, in order to straddle a projected extremity of the shaft 6 between the hub 11 of a wheel 10 and the adjacent side beams 2 while the upper side beams 2 are each provided with a loop 15 through which the member 12 is directed and maintained in operative assemblage. While I have shown the operating means for coacting with one of the wheels 10 as a conventional hand grasp 16, it will be readily perceived that, if desired, one of such wheels may be coupled with a suitable motor, although I do not wish to be understood as limiting myself in any way as to the manner whereby the shaft 6 may be caused to be rotated.

The upper side beams 2 have resting thereon a platform 17 and operatively supported by said platform 17 and the cross beam 4 is the vertical shaft 18, the lower extremity thereof being provided with a beveled gear 19 adapted to mesh with the gear 9 on the shaft 6. The upper extremity of the shaft 18 projects above the platform 17 and to such projected portion is adapted to be operatively engaged a plurality of differing devices in accordance with the necessities of practice.

The projected portion 20 of the vertical shaft 18 is threaded in order that the clamping members 21 may coact therewith in order to operatively engage with the vertical shaft a saw S or an emery wheel E, as may be required. The threaded extremity 20 also permits detachable engagement therewith of a bit socket or jaw J whereby a boring tool may be employed as desired.

My device as set forth in the accompanying drawings is of such a nature as may be stored within the home, and in order that the same may be used with convenience and facility as a fan, I employ a disk 22 adapted to be detachably engaged with the projected portion 20 of the shaft 18 and provided with the radially disposed elongated lugs 23 having similar faces flat and vertically disposed, and against certain of such faces are adapted to be positioned the stems 24 of the fans 25 and held in such position by one of the clamping members 21, hereinbefore referred to. In addition to serving as a medium for operatively supporting the fans 25, the disk 22 is intended to serve as a broadcast seeder. When employed as a seeder, the hopper H is detachably engaged upon the platform 17 with the discharge opening thereof directly above the disk whereby it will be perceived that the lugs 23 of the disk will serve to properly distribute the seed. When the device is employed as a seeder the wheels 10 are adapted to contact with the supporting surface whereby it will be perceived that upon advance of the body B, the shaft 6 will be caused to properly rotate, but when the device is employed for the other purposes, hereinbefore mentioned, the wheels 10 are maintained out of contact with the supporting surface, and, as herein set forth, the body B is maintained above its supporting surface through the medium of the endwise movable members 26 mounted for vertical movement within the loops 27 carried by the side beams 2 and having their lower extremities provided with the caster wheels 28 whereby it will be readily perceived that the body B may be transported from one locality to another with convenience and facility. In order to maintain the elongated members 26 in their proper adjustments, I provide each of such members with the openings 29 through which is adapted to project a pin 30 underlying the lowermost side beams 2 whereby it will be readily perceived that the body B may be maintained in an elevated position.

The projected extremities of the shafts 7 are also adapted to have the clamping members 21 engaged therewith if desired in order that the emery wheel E, the saw S or the disk 22 may be vertically disposed should the requirements of practice so require. The projected extremities of the shafts 7 are also adapted to have engaged therewith the disks 31, each of which being provided with a wrist pin 32 to which may be detachably engaged a pitman 33 operatively engaged with the vertically movable rod 34 carried by the frame 35 removably engaged with one of the end beams 3 and the upper extremity of said rod 33 is provided with a head 34' on which is adapted to be rested a suitable container C. The container is maintained against displacement by the vertically disposed arms 35' with which the clamping member 36 coacts, as is believed to be clearly shown in the accompanying drawings. By this arrangement, it will be seen that upon proper rotation of the coacting shaft 7, reciprocation will be imparted to the rod 33 whereby the contents of the receptacle C may be agitated. In practice, I have found this of especial advantage in the preparation of refreshing beverages and also for the purposes of churning. When the device is employed for the purposes of preparing beverages, I find it desirable to have the container C formed of two vessels adapted to telescope when in reverse adjustments, and in order that there may be no leakage during the reciprocation of the rod 33, I position within one of the vessels a gasket 37 with which the free edge of the coacting vessel is adapted to contact in a manner which is believed to be clearly apparent to those skilled in the art to which my present invention appertains.

It is to be observed that the vertical posts 1 project above the platform 17. When my improved machine is within the household, I find it of advantage to detachably connect the upper edges of the posts with the bars 38 provided at predetermined intervals with the upstanding spindles 39 on which spools of thread may be mounted. By this arrangement, it will be readily seen that my device, when normally inactive, may be employed as a sewing table. When in such use, I find it desirable to entirely remove the wheels 10 and the members 26 and to suitably affix to the lower extremities of the vertical posts 1 conventional casters. When in this latter condition my improved device affords a convenient piece of furniture, and it will thus be seen that there is substantially no time during which my improved device cannot be put to an effective use.

I also provide a means whereby my improved machine may be employed as a mower. When used for this purpose I detachably engage with one of the end posts 1 the supplemental member 40, a portion whereof projects below the lower extremity of the coacting post and to said enlarged extremity is pivotally engaged, as indicated at 41, the guide bar 42 in which is mounted for reciprocatory movement the cutter bar 43. Projecting beyond each longitudinal edge of the guide bar 42 are the guard fingers 44 while the cutter bar 43 is provided with the diamond-shaped cutting blades 45 projecting beyond the opposite longitudinal marginal portions of the guide bar whereby it will be readily perceived that a cutting operation may be created upon travel of the device in either direction and whereby the mowing attachment may be projected from either side of the body B, as the requirements of practice may necessitate. The inner extremity of the cutter bar 43 is provided with an upstanding lug 46 with which is adapted to be pivotally engaged an extremity of a pitman 47, the opposite extremity thereof being adapted to be pivotally engaged with the wrist pin 32 of a disk 31 operatively engaged with one of the shafts 7. The outer extremity of the guide bar 43 is provided with a shoe 47' of conventional formation and operatively engaged with such shoe is the bracing rod 48, the opposite extremity whereof being detachably engaged with the body B, as indicated at 49 in the accompanying drawings.

As any means which will operate with facility may be employed for propelling my improved device, I have purposely omitted any illustration or description thereof, as I wish to be understood as not limiting myself in this respect in any way whatever.

From the foregoing description, it is thought to be obvious that an agricultural machine constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A device of the character described comprising a body, a drive shaft carried thereby, wheels mounted upon the shaft and adapted for engagement with the surface on which the device rests, one of said wheels serving as an operating means for the shaft, a movable device carried by the body, an operative connection between the movable device and drive shaft, means for adjusting the body relative to its supporting surface, and traction wheels carried by said means for engaging the surface on which the body rests.

2. A device of the character described comprising a body, a drive shaft carried thereby, wheels mounted upon the shaft and adapted for engagement with the surface on which the device rests, one of said wheels serving as an operating means for the shaft, a movable device carried by the body, an operative connection between the movable device and drive shaft, means for adjusting the body relative to its supporting surface, wheels carried by said means adapted to engage the surface on which the device rests, said drive shaft being capable of endwise movement to control the operative connection therebetween and the movable device, and means for controlling the endwise movement of the shaft.

3. A device of the character described comprising a body, a drive shaft carried thereby, supporting wheels mounted upon the shaft, a movable element carried by the body, an operative connection between the movable element and the drive shaft, means for adjusting the body relative to its supporting surface whereby the wheels of the shaft may be brought in or out of contact with the supporting surface and wheels carried by said means adapted to ride over the surface on which the device rests.

4. A device of the character described comprising a body, a drive shaft carried thereby, means for rotating said drive shaft, a movable element carried by the body, an operative connection between the drive shaft and the movable element, vertically adjustable members carried by the body, wheels carried by the lower extremities of the members adapted to contact with the supporting surface, and means carried by the vertical members coacting with the body for adjusting the position of the body relative to the supporting surface.

5. A device of the character described comprising a body, a drive shaft carried thereby, wheels mounted on the shaft and adapted to engage the surface on which the device rests and to maintain the body elevated above said surface, a movable element carried by the body, an operative connection between the drive shaft and the movable element, vertically movable members carried by the body at opposite sides of the shaft, and means carried by the vertical members coacting with the body for adjusting the position of the body relative to the supporting surface.

6. A device of the character described comprising a body, a drive shaft carried by the body, said drive shaft being capable of endwise movement and projecting beyond opposite sides of the body, wheels secured to the projected extremities of the shaft, a movable element, an operative connection between the movable element and the drive shaft, the movement of the drive shaft in one direction breaking such connection, and endwise movable members carried by opposite sides of the body and adapted to extend between the outer face of a side of the body and the hub of an adjacent wheel for maintaining the drive shaft against endwise movement.

In testimony whereof I hereunto affix my signature in the presence of two witnesses.

ORA O. McKINNEY.

Witnesses:
O. E. BRUMBAUGH,
PHOEBE SIMPSON.

Copies of this patent may be obtained for five cents each, by addressing the "Commissioner of Patents, Washington, D. C."